UNITED STATES PATENT OFFICE 2,417,381

PREPARATION OF C-ACETYLATED COMPOUNDS

John A. Spence and Edward F. Degering, West Lafayette, Ind., assignors to Purdue Research Foundation, La Fayette, Ind., a corporation of Indiana No Drawing. Application August 30, 1945, Serial No. 613,698

8 Claims. (Cl. 260—483)

This invention relates to the preparation of C-acetylated compounds.

We have shown that β-diketones and β-ketoesters can be converted to enol acetates by condensing the β-diketones or β-ketoesters with ketene in the presence of an acid catalyst, such as an acid catalyst of the general formula:

$$X-SO_3-OH$$

wherein X represents a hydroxyl group, an organic group containing a non-metallic atom in addition to carbon and hydrogen, the X group being linked to the S atom through said non-metallic atom, or an inorganic group consisting of non-metallic atoms other than carbon, for example sulfuric acid, chlorosulfonic acid, alkylsulfuric acids, sulfamic acid, dimethylsulfamic acid, oleum, fluorosulfonic acid, N-acetylsulfamic acid, etc. See our copending applications Serial Nos. 556,886 and 556,887, each filed October 2, 1944 (now United States Patents 2,407,301 and 2,407,302, each dated September 10, 1946), of each of which the instant application is a continuation-in-part.

We have now found that ketene ($CH_2=C=O$) reacts with compounds containing a $$-CO-CH_2-CO-$$

group to give C-acetylated derivatives rather than unsaturated esters.

Our new process is an improvement over the known processes for preparing C-acetylated derivatives of ketoesters containing a $$-CO-CH_2-CO-$$

group, i. e. the processes involving treatment of the sodium derivative of a ketoester containing a —CO—CH$_2$—CO— group with acetyl chloride or acetic anhydride, in that our new process gives a much smaller amount of the O-acetylated derivative as side-reaction product; in fact the O-acetylated derivatives produced in our new process are usually practically negligible.

It is, accordingly, an object of our invention to provide a process for C-acetylating compounds containing a —CO—CH$_2$—CO— group. A further object is to provide new compounds. Other objects will become apparent hereinafter.

In accordance with our invention, we react ketene ($CH_2=C=O$) with a compound containing a —CO—CH$_2$—CO— group. The reaction takes place without a catalyst, although the use of catalysts is within the purview of our invention. Salenic acid ($H_2SeO_4$) may exert a slight catalytic action in some cases. Among other compounds containing a —CO—CH$_2$—CO— group, those represented by the following general formula are well suited for use in our invention.

I.        $R-CO-CH_2-CO-R'$ wherein R and R' each represents a member selected from the group consisting of an alkyl group, an aralkyl group, an aryl group, an alkoxyl group and an aryloxyl group. Typical examples of the compounds represented by the foregoing general formula I are: β-diketones (for instance acetylacetone, 2,4-hexanedione, 2,4-heptanedione, 5-methyl-2,4-hexanedione, acetylacetophenone, i. e. benzoylacetone, dibenzoylmethane, propionylacetophenone, n- and iso-butyrylacetophenone and acetylmethylbenzyl ketone, i. e. 1-phenyl-2,4-pentanedione), β-ketoesters (for instance methyl acetoacetate, ethyl acetoacetate, benzyl acetoacetate, ethyl propionacetate, methyl n-butyroacetate phenyl acetoacetate, ethyl-benzoylacetate and ethyl decanoylacetate) and malonic esters (for instance dimethyl malonate, diethyl malonate, di-n-propyl malonate, di-n-butyl malonate, dibenzyl malonate, diphenyl malonate, and methyl ethyl malonate).

In practicing our invention, the compound containing the —CO—CH$_2$—CO— group is placed in a reaction vessel. The compound is then raised to reaction temperature and ketene ($CH_2=C=O$), preferably freshly prepared, is added to the compound at a rate which substantially precludes the building up in the reaction mixture of any substantial quantity of unreacted ketene. The dispersion of the ketene in the reaction mixture is advantageously facilitated by agitation of the reaction mixture. Agitation also aids in avoiding local over-heating of the reaction mixture. The addition of ketene is advantageously continued until a quantity has been added which is at least as much as the molecular equivalent of the quantity of the compound containing the $$-CO-CH_2-CO-$$

group which is present, or until no further reaction takes place.

The ketene ($CH_2=C=O$) employed in practicing our invention can be prepared in any suitable manner. A convenient method for preparing ketene is by pyrolysis of acetone, advantageously removing the small quantity of residual acetone by passing the resulting vapors through a series of cold traps before utilizing the ketene for the condensation reaction of our invention.

The process of our invention takes place over a wide temperature range. Usually we have found that the reaction takes place at an appreciable rate at from about 60° to about 130° C., although higher or lower temperatures can be employed. Especially with the higher molecular weight compounds containing a

—CO—CH$_2$—CO— group, higher temperatures should be avoided in order to avoid thermal decomposition of the compound. The heat of reaction may require cooling of the reaction mixture to control the temperature within the desired range.

If desired a reaction medium which is inert to the ketene and the compound containing the

—CO—CH$_2$—CO— group, e. g. a saturated aliphatic hydrocarbon or an aromatic hydrocarbon, can be employed. However, a reaction medium is unnecessary in the case of most compounds containing a

—CO—CH$_2$—CO— group which are liquid at the reaction temperature employed.

The following examples will serve to illustrate further the manner of practicing our invention:

Example 1.—Triacetylmethane

0.5 mole of acetylacetone (50 g.) was placed in a reaction vessel. The reaction vessel was immersed in an electrically heated oil bath, and the contents of the vessel maintained at 105° C.±5°. Ketene (about 1.5 moles), generated by the pyrolysis of acetone, was passed into the heated acetylacetone over a period of about 2 hours, while stirring the reaction mixture. At the end of this time, the dark reaction liquor was removed and shaken with a little sodium acetate and allowed to stand for about 12 hours. The liquor was then filtered, and the filtered liquor subjected to distillation under reduced pressure. The clear distillate was then fractionated through a small Podbielniak column. 10 ml. of acetylacetone were recovered. 45 ml. (80 per cent conversion) of triacetylmethane, boiling at 100–104° C. at 19 mm. Hg pressure, were obtained. The following tabulation shows the results of still further preparations of triacetylmethane by our process:

| Acetylacetone | Selenic acid | Temp. ±5° | Yield |
|---|---|---|---|
| Moles | Grams | °C. | Ml. |
| 0.5 | 1 | 75 | 35 |
| 0.5 | None | 80 | 34 |
| 0.5 | 1.2 | 105 | 45 |
| 0.5 | None | 105 | 45 |

From these results, it does not appear that selenic acid catalyzes the reaction. In a similar manner the following β-diketones can be converted into C-acetylated compounds:

| β-diketone | C-acetylated compound |
|---|---|
| 2,4-hexanedione | Diacetylpropionylmethane. |
| 2,4-heptanedione | Diacetyl-n-butyrylmethane. |
| 5-methyl-2,4-hexanedione | Diacetylisobutyrylmethane. |
| Acetylacetophenone | Diacetylbenzoylmethane. |
| Propionylacetophenone | Diacetylbenzoylpropionylmethane. |
| n-Butyrylacetophenone | Acetylbenzoyl-n-butyrylmethane. |
| Isobutyrylacetophenone | Acetylbenzoylisobutyrylmethane. |
| Acetylmethylbenzyl ketone | Diacetylphenylacetylmethane. |

Example 2.—Diacetylcarbethoxymethane (ethyl α-acetylacetoacetate)

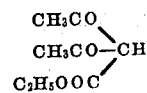

One mole of ethyl acetoacetate (130 g.) was placed in a reaction vessel together with 0.7 g. of selenic acid. The reaction vessel was immersed in an electrically heated oil bath and the contents of the vessel maintained at 75° C.±5°. Ketene (2.25 moles), generated by the pyrolysis of acetone, was passed into the heated ethyl acetoacetate-selenic acid mixture over a period of about 3 hours. The resulting dark liquor was removed from the reaction vessel, treated with a little sodium acetate and filtered. The filtered liquor was distilled under reduced pressure and 125 ml. (80 per cent conversion) of diacetylcarbethoxymethane, boiling at 85–90° C. at 10 mm. of Hg pressure, were obtained. The following tabulation shows the results of still further preparations of diacetylcarbethoxymethane by our process:

| Ethyl acetoacetate | Selenic acid | Temp. ±5° | Yield |
|---|---|---|---|
| Moles | Grams | °C. | Ml. |
| 0.5 | 1 | 100 | 7.5 |
| 0.5 | None | 130 | 3.0 |
| 0.5 | 1.2 | 105 | 4.0 |
| 1.0 | 0.7 | 75 | 125.0 |
| 1.0 | None | 80 | 106.0 |
| 0.5 | (¹) | 75 | 32.0 |

¹ 1 gram of sodium acetate instead of selenic acid was used.

From these data it appears that selenic acid has a slight catalytic effect on the reaction. In a similar manner the following β-ketoesters can be converted into C-acetylated compounds:

| β-ketoester | C-acetylated compound |
|---|---|
| Methylacetoacetate | Diacetylcarbmethoxymethane. |
| Benzylacetoacetate | Diacetylcarbphenylmethoxymethane. |
| Ethyl propionoacetate | Acetylcarbethoxypropionylmethane. |
| Methyl n-butyroacetate | Acetyl-n-butyrylcarbmethoxymethane. |
| Phenyl acetoacetate | Diacetylcarbphenoxymethane. |
| Ethyl decanoylacetate | Acetylcarbethoxydecanoylmethane. |

Example 3.—Acetyldicarbethoxymethane (acetyldiethylmalonate)

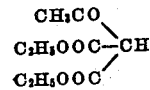

One-half mole of diethyl malonate (80 g.) and 1 g. of selenic acid (sp. g. 1.4) were placed in a reaction vessel. The reaction vessel was placed in an electrically heated oil bath and the contents of the vessel maintained at 100° C.±5°. Ketene (about 1.5 moles), generated by the pyrolysis of acetone, was passed into the heated diethyl malonate-selenic acid mixture over a period of 2 hours. At the end of this time, the dark reaction liquor was shaken with a little sodium acetate and allowed to stand for about 12 hours. It was then filtered and distilled under reduced pressure. 7.5 ml. of acetyldicarbethoxymethane, boiling at 120–123° C. at 18 mm. of Hg pressure, were obtained when the distillate was rectified with a small Podbielniak column. In a similar manner the following malonates can be converted into C-acetylated compounds:

| Malonate | C-acetylated compound |
|---|---|
| Dimethyl malonate | Acetyldicarbmethoxymethane. |
| Di-n-propyl malonate | Acetyldicarb-n-propoxymethane. |
| Di-n-butyl malonate | Acetyldicarb-n-butoxymethane. |
| Diphenyl malonate | Acetyldicarbphenoxymethane. |
| Dibenzyl malonate | Acetyldicarbphenylmethoxymethane. |

*Example 4.—Acetyldibenzoylmethane (β-form)*

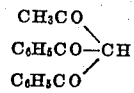

Ketene was passed into 10 g. (0.3 mole) of dibenzoylmethane for about 30 minutes, at a temperature between 80 and 110° C., while agitating the dibenzoylmethane. The resulting light viscous oil was crystallized from 50% aqueous ethanol. 9 g. of acetyldibenzoylmethane thus obtained were recrystallized from 270 ml. of 50 per cent aqueous ethanol and 8.5 g. of acetyldibenzoylmethane were obtained (M. P. 80–85° C. softens; 107–115° C. melts). This range of melting point is owing to an equilibrium between the α- and β-forms of acetyldibenzoylmethane. The yield of β-acetyldibenzoylmethane was 66 per cent.

*Example 5. — Acetylbenzoylcarbethoxymethane (ethyl-α-acetylbenzoylacetate)*

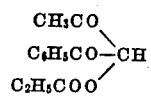

Ketene (1.2 moles) was passed into 96 g. (0.5 mole) of ethyl benzoylacetate over a period of 2 hours, at 80° C.±5°, while thoroughly agitating the ethylbenzoylacetate. The resulting dark reaction liquor was distilled from a Claisen flask at reduced pressure. 71 g. of acetylbenzoylcarbethoxymethane, boiling at 148 to 156° C. at 5 mm. of Hg pressure, were obtained. This material was soluble in dilute alkali and gave a blue copper salt.

In a manner similar to that illustrated in the foregoing examples, other compounds containing a —CO—CH₂—CO— group can be C-acetylated. Small amounts of water can be present in the reaction mixtures without adversely affecting the process.

What we claim and desire to be secured by Letters Patent of the United States of America is:

1. In a process for preparing C-acetylated compounds of the following general formula:

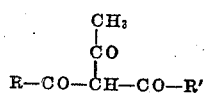

wherein R and R' each represents a member selected from the group consisting of an alkyl group, an aralkyl group, an aryl group, an alkoxyl group and an aryloxyl group, the step which comprises reacting ketene (CH₂=C=O) with a carbonyl compound selected from the group of compounds represented by the following general formula:

R—CO—CH₂—CO—R' wherein R and R' each represents a member selected from the group consisting of an alkyl group, an aralkyl group, an aryl group, an alkoxyl group and an aryloxyl group, the carbonyl compound and the ketene being the sole reactants present.

2. In a process for preparing C-acetylated compounds of the following general formula:

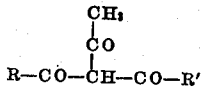

wherein R and R' each represents an alkyl group, the step which comprises reacting ketene (CH₂=C=O) with a β-diketone selected from the group of β-diketones represented by the following general formula:

R—CO—CH₂—CO—R' wherein R and R' each represents an alkyl group, the β-diketone and the ketene being the sole reactants present.

3. In a process for preparing triacetylmethane, the step which comprises ketene (CH₂=C=O) with acetylacetone, the acetylacetone and the ketene being the sole reactants present.

4. In a process for preparing C-acetylated compounds of the following general formula:

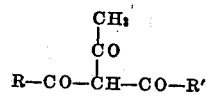

wherein R represents an alkyl group and R' represents an alkoxyl group, the step which comprises condensing ketene (CH₂=C=O) with a β-ketoester selected from the group of β-ketoesters represented by the following general formula:

R—CO—CH₂—CO—R' wherein R represents an alkyl group and R' represents an alkoxyl group, the β-ketoester and the ketene being the sole reactants present.

5. In a process for preparing diacetylcarbethoxymethane, the step which comprises reacting ketene (CH₂=C=O) with ethylacetoacetate, the ethylacetoacetate and the ketene being the sole reactants present.

6. In a process for preparing C-acetylated compounds of the following general formula:

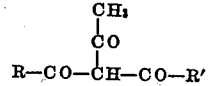

wherein R and R' each represents an alkoxyl group, the step which comprises reacting ketene (CH₂=C=O) with a malonic ester selected from the group of malonic esters represented by the following general formula:

R—CO—CH₂—CO—R' wherein R and R' each represents an alkoxyl group, the malonic ester and the ketene being the sole reactants present.

7. In a process for preparing acetyldicarbethoxymethane, the step which comprises reacting ketene (CH₂=C=O) with diethylmalonate, the diethylmalonate and the ketene being the sole reactants present.

8. In a process for preparing C-acetylated compounds of the following general formula:

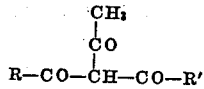

wherein R and R' each represents a member selected from the group consisting of an alkyl group, an aralkyl group, an aryl group, an alkoxyl group and an aryloxyl group, the step which comprises reacting, in an inert reaction medium, ketene ($CH_2=C=O$) with a carbonyl compound selected from the group of compounds represented by the following general formula:

$$R-CO-CH_2-CO-R'$$

wherein R and R' each represents a member selected from the group consisting of an alkyl group, an aralkyl group, an aryl group, an alkoxyl group and an aryloxyl group, the carbonyl compound and the ketene being the sole reactants present.

JOHN A. SPENCE.
EDWARD F. DEGERING.

REFERENCES CITED

The following references are of record in the file of this patent:

FOREIGN PATENTS

| Number | Country | Date |
|--------|---------|------|
| 666,703 | French | Oct. 4, 1929 |

OTHER REFERENCES

Gwynn et al., "Journ. Am. Chem. Soc.," vol. 64 (1942), pp. 2216-2218.